United States Patent [19]
Mahurin

[11] Patent Number: 5,926,407
[45] Date of Patent: Jul. 20, 1999

[54] COMBINED ADD/SHIFT STRUCTURE

[75] Inventor: Eric W. Mahurin, Austin, Tex.

[73] Assignee: Advanced Micro Devices, Inc., Sunnyvale, Calif.

[21] Appl. No.: 08/812,027

[22] Filed: Mar. 6, 1997

[51] Int. Cl.$^6$ .................................................. G06F 7/50
[52] U.S. Cl. ................................ 364/787.01; 364/715.08
[58] Field of Search ........................ 364/715.08, 716.05, 364/787.01

[56] References Cited

U.S. PATENT DOCUMENTS

| | | | |
|---|---|---|---|
| 4,504,924 | 3/1985 | Cook et al. | 364/787.01 |
| 4,623,981 | 11/1986 | Wolrich et al. | 364/787.01 |
| 4,882,698 | 11/1989 | Young | 364/787.01 |
| 5,436,574 | 7/1995 | Veenstra | 364/216.05 |

*Primary Examiner*—David H. Malzahn
*Attorney, Agent, or Firm*—Conley, Rose & Tayon, PC; B. Noel Kivlin

[57] ABSTRACT

The problems identified above are in large part addressed by a combined add/shift circuit. In one embodiment, first and second operands are received by a first stage that produces single-bit propagate and generate information in response to the operands and a mode signal. The single-bit propagate and generate information is then processed with a carry bit by one or more intermediate stages that form final carry information as dictated by a shift control circuit. The carry information is then supplied to a final stage together with an XOR of the input operands. The final stage generates the result bits in response to the final carry information and the XOR of the input operands. The use of propagate and generate information reduces the time delay required by the adder circuit while the use of the control circuitry enables the adder circuit to function as a barrel shifter. In the add mode, the final carry information produced contains enough information about the first and second operands such that the sum of the first and second operands can be directly produced from the final carry information and the XOR of the input operands. In the shift mode, the final carry information is indicative of the shifted first operand.

15 Claims, 3 Drawing Sheets

FIG. 1

|     | ADD | ADC | SHL | ROL | SHR | ROR |
| --- | --- | --- | --- | --- | --- | --- |
| (a) | M2  | M2  | M3  | M3  | M4  | M1  |
| (b) | –   | –   | M3  | M2  | M1  | M1  |
| (c) | M4  | M2  | M3  | M3  | M1  | M1  |
| (d) | M1  | M1  | M2  | M2  | M3  | M3  |

COMBINED ADD/SHIFT STRUCTURE

BACKGROUND OF THE INVENTION

1. Field of the Invention

This invention relates to adders and more particularly to a circuit and method in which a carry look-ahead adder is modified to support both adding and shifting of input bits.

2. Description of the Related Art

Microprocessors determine the speed and power of personal computers, and a growing number of more powerful machines, by handling most of the data processing in the machine. Microprocessors typically include at least three functional groups: the input output unit (I/O unit), the control unit, and the arithmetic-logic unit (ALU). The I/O unit interfaces between external circuitry and the ALU and the control unit. I/O units frequently include signal buffers for increasing the current capacity of a signal before the signal is sent to external components. The control unit controls the operation of the microprocessor by fetching instructions from the I/O unit and translating the instructions into a form that can be understood by the ALU. In addition, the control unit keeps track of which step of the program is being executed. The ALU handles the mathematical computations and logical operations that are performed by the microprocessor. The ALU executes the decoded instructions received from the control unit to modify data contained in registers within the microprocessor.

An essential component of any ALU is the adder circuit. The adder circuit performs addition operations on two or more input operands. Because the addition operation is one of the most commonly invoked operations during the execution of a computer program, the speed with which the adder circuit can compute the sum (or difference) of two input operands is extremely important in determining the speed of the overall system.

Several common adder circuits are well known in the field of digital logic A ripple-carry adder, for example, adds two (or possibly more) operands in much the same manner as a person would add two numbers The least significant bit of the first operand is added to the least significant bit of the second operand (and possibly a carry-in bit) to produce a least significant result bit and a least significant carry bit. The least significant carry bit is then added to the next most significant bit of the first operand and the next most significant bit of the second operand to produce a next most significant result bit and a next most significant carry bit. This sequence continues until, eventually, the most significant bits of the operands have been added together with the carry bit from the preceding stage to produce the most significant result bit and a carry-out bit. The carry-out bit of the ripple carry adder can be used as a carry-in bit to a subsequent adder circuit such that multiple ripple carry adders can be connected together in series.

Those skilled in the art of digital circuit design will appreciate that a least significant result bit is generated prior to an intermediate significant result bit which, in turn, is generated prior to a mast significant result bit. Therefore, there is a time delay between the generation of the least significant result bit and the most significant result bit. With each additional stage, the time delay between generation of the least significant result bit and the most significant result bit increases more or less linearly, negatively impacting the overall performance of the ALU, the microprocessor, and ultimately, the computing system as a whole.

It would be therefore be desirable to produce an adder circuit that achieves a significant reduction in the time required to produce a particular result without significantly increasing the amount of silicon required to implement the circuit and without significantly increasing the input loading. It would be even more desirable for the function of the produced adder circuit to subsume the function of another special-purpose circuit in the ALU, thereby allowing the special purpose circuit to be eliminated.

SUMMARY OF THE INVENTION

The problems identified above are in large part addressed by a combined add/shift circuit. In one embodiment, first and second operands are received by a first stage that produces single-bit propagate and generate information in response to the operands and a mode signal. The single-bit propagate and generate information is then processed with a carry bit by one or more intermediate stages that form final carry information as dictated by a shift control circuit. The carry information is then supplied to a final stage together with an XOR of the input operands. The final stage generates the result bits in response to the final carry information and the XOR of the input operands. The use of propagate and generate information reduces the time delay required by the adder circuit while the use of the control circuitry enables the adder circuit to function as a barrel shifter. In the add mode, the final carry information produced contains enough information about the first and second operands such that the sum of the first and second operands can be directly produced from the final carry information and the XOR of the input operands. In the shift mode, the final carry information is indicative of the shifted first operand.

Broadly speaking, the present invention contemplates an adder circuit comprising a first stage configured to receive an n-bit first operand and an n-bit second operand. The first stage is configured to produce n bits of single bit propagate information and n bits of single-bit generate information in response to the first and second operands. The first stage is also configured to produce n XOR bits which in the add mode represent the bit-wise XOR of the input operands. The adder circuit further comprises one or more intermediate stages each configured to shift received bits of propagate information and received bits of generate information if a shift bit is asserted, and configured to combine received bits of propagate information and received bits of generate information if the shift bit is not asserted. The intermediate stages are also configured to shift received carry bits when the shift bit is asserted, and to combine the received carry bits with received generate and propagate information bits to generate new carry bits when the shift bit is not asserted. The adder circuit further comprises a final stage which processes the final carry bits and final propagate and generate information bits to produce n result bits and a carry-out bit. When the circuit is in an add mode, the result bits are indicative of the sum of the first and second operands. In the shift mode, the result bits are indicative of the shifted first operand.

BRIEF DESCRIPTION OF THE DRAWINGS

Other objects and advantages of the invention will become apparent upon reading the following detailed description and upon reference to the accompanying drawings in which.

DETAILED DESCRIPTION OF THE INVENTION

Figure 1:
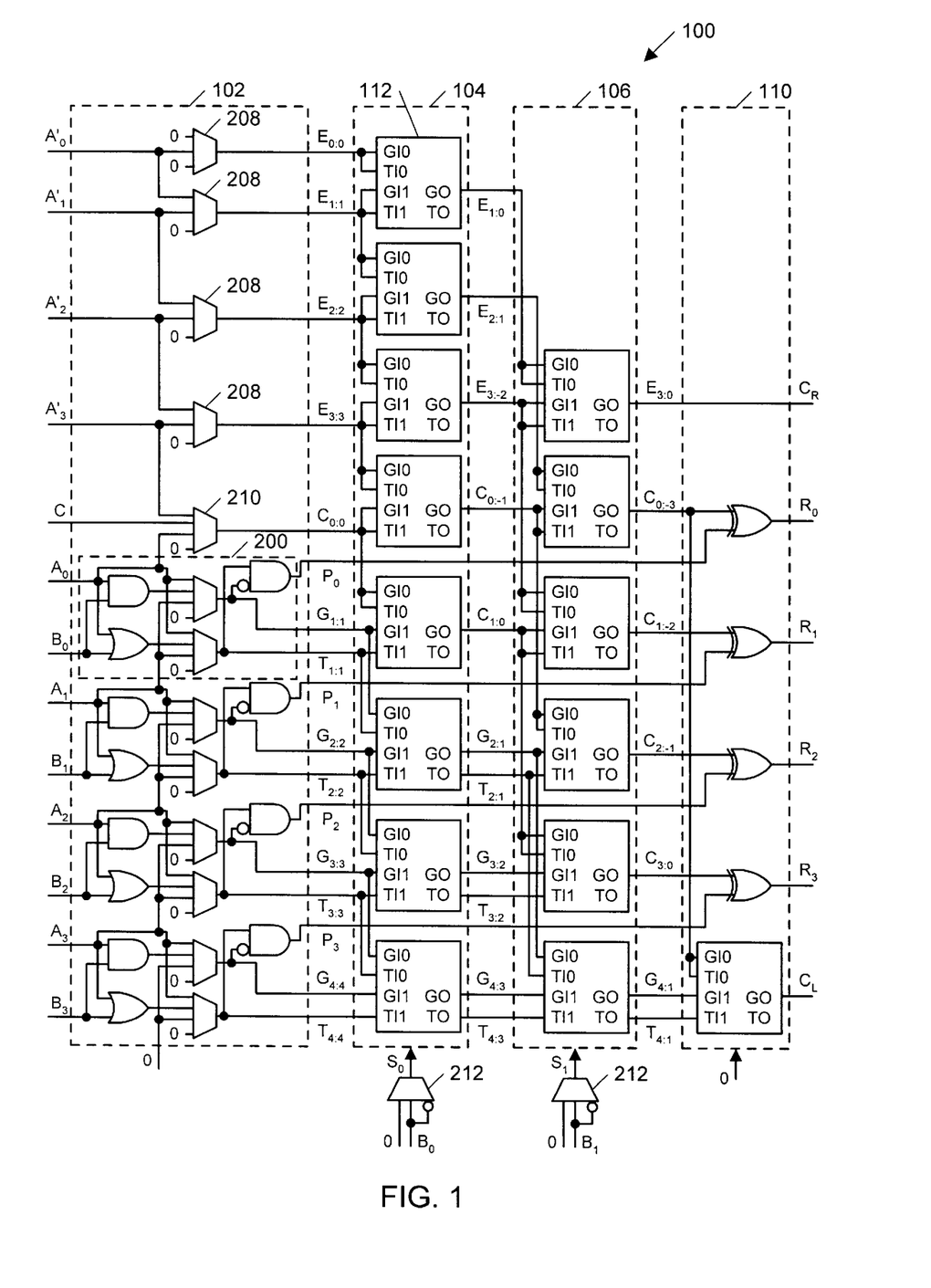
FIG. 1 is a block diagram of a 4-bit combined add/shift circuit.

Turning now to FIG. 1, an add/shift circuit 100 includes first stage 102 which is configured to receive a first operand A, a second operand B, and a carry-in bit C. First operand A and second operand B preferably comprise n bits (denoted $a_{n-1}$-$a_0$ and $b_{n-1}$-$b_0$, respectively). In the embodiment depicted, n is equal to 4, but it is understood that alternative values of n are easily accommodated within the scope of the present invention. First stage 102 is configured to produce n bits of single-bit propagate information (denoted $T_{n:n}$-$T_{1:1}$) and n bits of single-bit generate information (denoted $G_{n:n}$-$G_{1:1}$) in response to the first and second operands. First stage 102 is also configured to produce n XOR bits ($P_{n-1}$-$P_0$), a first carry bit $c_{0:0}$ and n extra bits ($E_{n-1:n-1}$-$E_{0:0}$). Add/shift circuit 100 further includes one or more intermediate stages. Intermediate stage 104 is configured to produce n−1 bits of two-bit propagate information ($T_{n:n-1}T_{2:1}$), n−1 bits of two-bit generate information ($G_{n:n-1}$-$G_{2:1}$), two carry bits ($c_{1:0}$-$c_{0:-1}$) and n−1 extra bits ($E_{n-1:n-2}$-$E_{1:0}$) in response to a shift bit $s_0$, the single-bit generate information ($T_{n:n}$-$T_{1:1}$), the single-bit propagate information ($G_{n:n}$-$G_{1:1}$), the first carry bit $c_{0:0}$, and the extra bits ($E_{n-1:n-1}$-$E_{0:0}$). Succeeding intermediate stages produce n+1−2 k-bits of 2k-bit propagate information ($T_{n:n+1-2k}$-$T_{2k:1}$), n+1−2 k bits of 2k-bit generate information ($G_{n:n+1-2k}$-$G_{2k:1}$), 2k carry bits ($c_{2k-1:0}$-$c_{0:1-2k}$), and n+1−2 k extra bits ($E_{n-1:n+1-2k}$-$E_{2k-1:0}$) in response to a shift bit, the propagate information, the generate information, the carry bits, and the extra bits from the previous stage. Add/shift circuit 100 further comprises a final stage 110 which accepts a final propagate information bit ($T_{n:1}$), a final generate information bit ($G_{n:1}$), n carry bits ($c_{n-1:0}$-$c_{0:1-n}$), and one extra bit ($E_{n-1:0}$) from a last intermediate stage 106. Final stage 110 further accepts n XOR bits ($P_{n-1}$-$P_0$) from first stage 102, and responsively provides a result comprising n result bits (denoted $R_{n-1}$-$R_0$), a carry-out bit ($c_L$) and a right-carry bit ($c_R$). The result is preferably indicative of the sum of first operand A and second operand B when an add-mode is selected, and is preferably indicative of a shifted first input operand when a shift mode is selected.

In a presently preferred embodiment, first stage 102 of adder circuit 100 is configured to receive first operand bits $a_{n-1}$-$a_0$, second operand bits $b_{n-1}$-$b_0$, carry-in bit c, and a mode signal. First stage 102 is configured to produce n bits of single-bit propagate information, n bits of single-bit generate information, a first carry bit $c_{0:0}$, and n extra bits $E_{n-1:n-1}$-$E_{0:0}$. In the preferred embodiment, the meaning of the propagate information, generate information, carry information, and extra bits is determined by the mode signal. Six modes are described herein: add (ADD), add-with-carry (ADC), shift-left (SHL), rotate-left (ROL), shift-right (SHR), and rotate-right (ROR).

Figure 2:
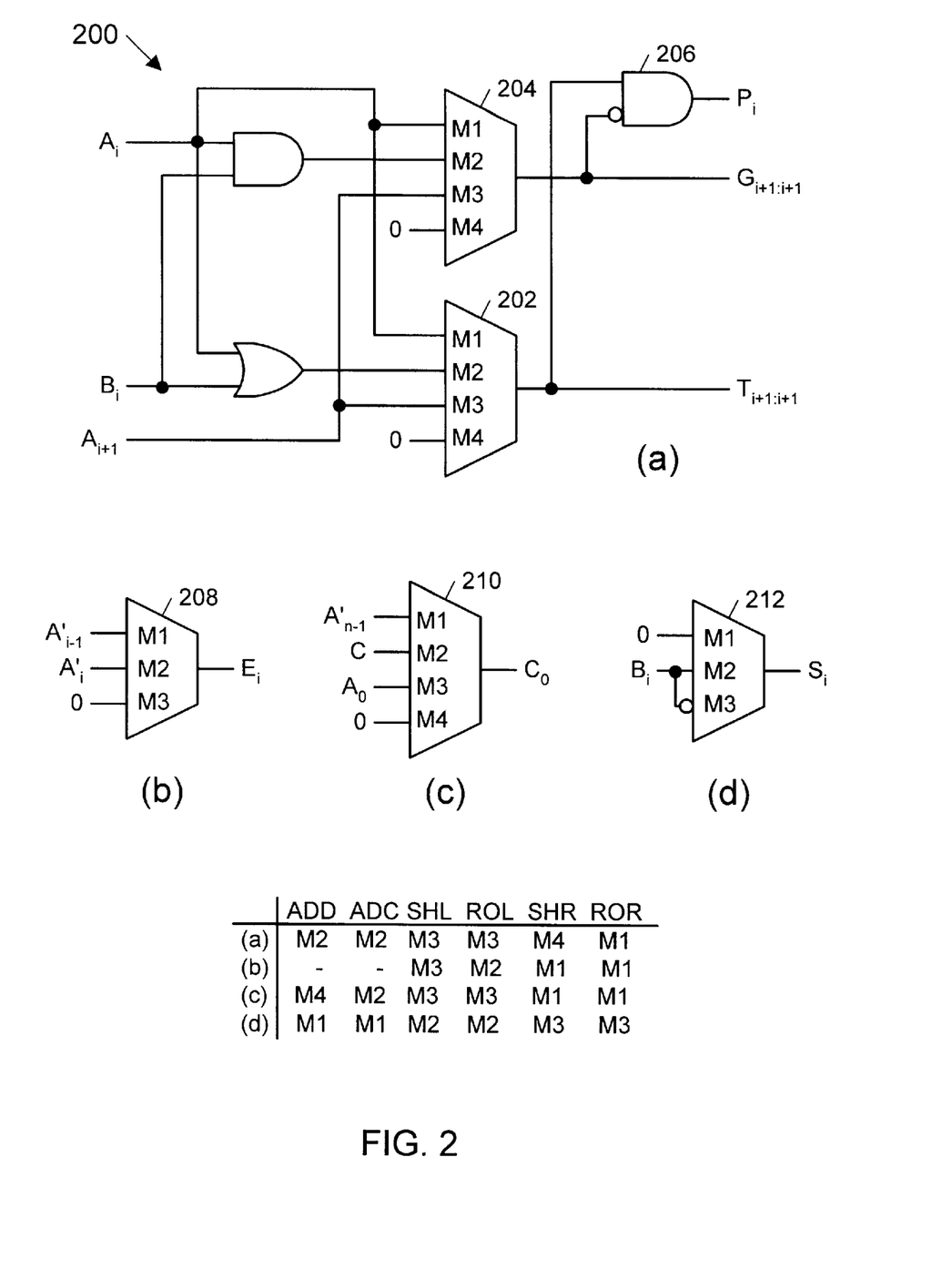
FIG. 2 is a block diagram of support modules of a combined add/shift circuit.

Turning to FIG. 2a, way in which the mode signal controls the meaning of the generate and propagate information bits is illustrated. FIG. 2 also shows a table which summarizes the function of the mode signal. When the mode signal is set to indicate the ADD or ADC mode, multiplexers 202, 204 of a first stage module 200 in FIG. 2a pass the signal at M2 to their output lines, as indicated by the first two entries in the table. Thus, in the ADD, ADC modes each bit of said single-bit propagate information ($T_{i+1:i+1}$) is indicative of whether a corresponding bit of first operand A or a corresponding bit of second operand B are true. In other words, if $T_{j+1:j+1}$ represents a bit of single-bit propagate information, then $t_{j+1}=a_j$ OR $b_j$. Also in these modes, each bit of generate information ($G_{i+1:i+1}$) is indicative of whether a corresponding bit of first operand A and a corresponding bit of second operand B are true (i.e., $G_{j+1:j+1}=a_j$ AND $b_j$). Each bit of single-bit propagate information provides information useful in determining the carry bits that will be produced by the summation of first operand A and second operand B. More specifically, each bit of single-bit propagate information indicates whether a carry bit provided into the bit position corresponding to the single-bit propagate information bit will be propagated to the next bit position. If, for example, the single-bit propagate information bit corresponding to position 1 ($T_{2:2}$) is true, then it is known that a carry bit from the previous bit position (bit position 0 in this case) will be propagated through bit position 1 such that a carry bit will be provided to bit position 2. Similarly, each bit, $G_{j+1:j+1}$, of single-bit generate information indicates whether a carry bit will be generated in the bit position corresponding to the bit position of $G_{j+1:j+1}$ by the addition of $a_j$ and $b_j$. If, for example, $G_{2:2}$ is true, then it is known that a carry bit $c_2$ will be generated by the addition of $a_1$ and $b_1$ (regardless of the value of $c_1$).

The individual bits within single-bit propagate information and the individual bits within single-bit generate information can be logically manipulated to produce lookahead information. The lookahead information can be used to determine whether a carry bit will propagate through a particular block of operand bits or whether a particular block of operand bits will generate a carry bit. The lookahead information can be used to determine individual values of the carry bits produced by the summation of first operand A and second operand B if the value of a preceding carry bit is known. In particular, $c_j=G_{(j-1):i}+T_{(j-1):i}C_i$, where $G_{(j-1):i}$ indicates whether a carry bit is generated in the block of operand bits beginning with bit position i and ending with bit position j−1 and $T_{(j-1):i}$ indicates whether a carry bit would propagate through the block of operand bits beginning with bit position i and ending with bit position j−1 of first operand A and second operand B. For a discussion of this equation and of computer arithmetic more generally, see John L. Hennessy and David A. Patterson—Computer Architecture, A Quantitative Approach—Appendix A, (Morgan Kaufmann 1990), which is incorporated herein by reference. If a circuit is configured to produce the appropriate values of $G_{(j-1):i}$ and $T_{(j-1):i}$, then the appropriate carry bits $c_j$ can be generated quickly once the value of carry bits $c_i$ are known. With the carry bits known, the summation of the operands can be quickly determined.

FIG. 2a also shows that for the SHL and ROL modes, multiplexers 202, 204 pass the M3 input to their output lines. In this case, the meaning of the generate and propagate bits is the same and equal to one of the first operand bits: $G_{i+1:i+1}=T_{i+1:i+1}=a_{i+1}$. As will be discussed in greater detail below, the first operand bits are then left shifted by the rest of combined add/shift circuit 100. It is noted that a right shift of an n-bit operand can be accomplished by moving the operand to the rightmost n bits of a 2n-bit register, left shifting up to n−1 times, and retaining only the leftmost n bits of the result. It is noted that add/shift circuit 100 operates in a similar fashion in the SHR mode. In this case, the M4 inputs of multiplexers 202, 204 are selected, and the meaning of the generate and propagate bits is the same and equal to 0. The distinction between the SHR and ROR modes is that the uppermost bits of the n bit result are not necessarily zero, but are equal to the bits which have "wrapped around" by being right shifted past bit position 0. The rotate-right can be accomplished by copying the n-bit operand to both the rightmost n bits and leftmost n bits of a 2n bit register, left shifting up to n−1 times, and retaining only the leftmost n bits of the result. Combined add/shift circuit 100 operates in a similar fashion in the ROR mode. In this case, the M1 inputs of multiplexers 202, 204 are selected, and the meaning of the generate and propagate bits is the same and equal to one of the operand bits: $G_{i+1:i+1} = T_{i+1:i+1} = a_i$.

In the ADD and ADC modes, the output $P_i$ of AND gate 206 represents the exclusive OR (XOR) of input operand bits $a_i$ and $b_i$. In the remainder of the modes, the single-bit propagate and generate information bits are equal, and the output $P_i$ of AND gate 206 is equal to 0.

Turning now to FIG. 2b, the operation of multiplexer 208 is described. The output of multiplexer 208 is one of the extra bits $e_i$, which represent the rightmost n bits of the hypothesized 2n bit register used as an example above. In the ADD and ADC modes, the output of multiplexer 208 has no effect on the output result of combined add/shift circuit 100, so any input may be chosen. In the SHL mode, the M3 input is selected, so that $E_{i:i} = 0$. In the ROL mode, the M2 input is selected, so that $E_{i:i} = a_i$. In the SHR and ROR modes, the M1 input is selected, so that $E_{i:i} = a_{i-1}$.

FIG. 2c illustrates the operation of multiplexer 210. The output of multiplexer 210 is the first carry bit $c_0$. In ADD mode, the M4 input is selected, so that $c_{0:0} = 0$. In ADC mode, the M2 input is selected, so that the first carry bit is equal to the carry-in bit: $c_{0:0} = C$. In SHL and ROL modes, the M3 input is selected, so that $c_{0:0} = a_0$. In SHR and ROR modes, the M1 input is selected, so that $c_{0:0} = a_{n-1}$.

FIG. 2d illustrates the operation of multiplexer 212. The output of multiplexer 212 is shift bit $S_i$. The shift bits form a binary number representing the number of positions by which the first operand A is shifted. In ADD and ADC modes, the M1 input is selected, so that $S_i = 0$. In SHL and ROL modes, the M2 input is selected, so that $S_i = b_i$. In SHR and ROR modes, the M3 input is selected, so that $S_i = \bar{b}_i$.

Returning to FIG. 1, first stage 102 provides the generate information bits, the propagate information bits, the XOR information bits, the carry bit, and the extra bits according to the following chart:

within first and second operands A and B. Each $G_{j:i}$ indicates whether a carry bit is generated out of the block of operand bits. More specifically, the block of operand bits begins with bit position i and ends with bit position j.

The individual values of $T_{j:i}$ and $G_{j:i}$ are sequentially produced by the intermediate stages. The intermediate stages are comprised of intermediate stage modules. An intermediate stage module 112 operates according to the logical relationships shown below:

$$G_0 = G_{i1}\bar{S} + (T_{i1} + S)G_{i0} \text{ and } T_0 = G_{i1}\bar{S} + (T_{i1} + S)T_{i0}.$$

Assuming for the moment that shift bit S is FALSE, the full module relationships become:

$$G_0 = G_{i1} + T_{i1}G_{i0}$$

and $$T_0 = G_{i1} + T_{i1}T_{i0}.$$

If $G_{i1}$ is $G_{k:j}$ (the generate bit for the block of bits starting with bit position j and ending with bit position k), $T_{i1}$ is $T_{k:j}$ (the propagate bit for the block of bits starting with bit position j and ending with bit position k), and $G_{i0}$ is $G_{(j-1):i}$ (the generate bit for the block of bits starting with bit position i and ending with bit position j−1), then $G_0$ is $G_{k:i}$ (the generate bit for the block of bits starting with bit position i and ending with bit position k). This can be intuited from the observation that a carry bit is generated from a block if a carry bit is generated in the upper part of the block, or if a carry bit is generated in the lower part of the block and propagated through the upper part of the block. Additionally, if $T_{i0}$ is $T_{(j-1):i}$ (the propagate bit for the block of bits starting with bit position i and ending with bit position j−1), then $T_0$ is $T_{k:i}$ (the propagate bit for the block of bits starting with bit position i and ending with bit position k). This can be determined from the observation that a carry bit propagates through a block if it propagates through both the lower part and upper part of the block. The $G_{i1}$ term in the second equation is an extra term included to guarantee an equational symmetry which allows for a sim-

|     | $E_{0:0}$ | $E_{1:1}$ | $E_{2:2}$ | $E_{3:3}$ | $c_{0:0}$ | $G_{1:1}$ | $G_{2:2}$ | $G_{3:3}$ | $G_{4:4}$ | $T_{1:1}$ | $T_{2:2}$ | $T_{3:3}$ | $T_{4:4}$ | $P_0$ | $P_1$ | $P_2$ | $P_3$ |
|-----|-----------|-----------|-----------|-----------|-----------|-----------|-----------|-----------|-----------|-----------|-----------|-----------|-----------|-------|-------|-------|-------|
| add | x | x | x | x | 0 | $a_0b_0$ | $a_1b_1$ | $a_2b_2$ | $a_3b_3$ | $a_0+b_0$ | $a_1+b_1$ | $a_2+b_2$ | $a_3+b_3$ | $a_0 \oplus b_0$ | $a_1 \oplus b_1$ | $a_2 \oplus b_2$ | $a_0 \oplus b_3$ |
| adc | x | x | x | x | c | $a_0b_0$ | $a_1b_1$ | $a_2b_2$ | $a_3b_3$ | $a_0+b_0$ | $a_1+b_1$ | $a_2+b_2$ | $a_3+b_3$ | $a_0 \oplus b_0$ | $a_1 \oplus b_1$ | $a_2 \oplus b_2$ | $a_0 \oplus b_3$ |
| shl | 0 | 0 | 0 | 0 | $a_0$ | $a_1$ | $a_2$ | $a_3$ | x | $a_1$ | $a_2$ | $a_3$ | 0 | 0 | 0 | 0 | 0 |
| rol | $a_0$ | $a_1$ | $a_2$ | $a_3$ | $a_0$ | $a_1$ | $a_2$ | $a_3$ | x | $a_1$ | $a_2$ | $a_3$ | 0 | 0 | 0 | 0 | 0 |
| shr | x | $a_0$ | $a_1$ | $a_2$ | $a_3$ | 0 | 0 | 0 | 0 | 0 | 0 | 0 | 0 | 0 | 0 | 0 | 0 |
| ror | x | $a_0$ | $a_1$ | $a_2$ | $a_3$ | $a_0$ | $a_1$ | $a_2$ | $a_3$ | $a_0$ | $a_1$ | $a_2$ | $a_3$ | 0 | 0 | 0 | 0 |

In the chart, x represents a "don't care", meaning that in different embodiments, a 0 or a 1 may be the indicated result of the operations.

The intermediate stages of add/shift circuit 100 comprise a presently preferred embodiment of a circuit designed to produce $T_{j:i}$ and $G_{j:i}$ values. These values are used to provide the carry bits and the final propagate and generate information to final stage 110. As will be appreciated to those skilled in the art, each bit $T_{j:i}$ of propagate information corresponds to a block of bits of first and second operands A and B. Each $T_{j:i}$ indicates whether a carry bit provided to the block of operand bits would propagate through the block of operand bits. More specifically, the block of operand bits associated with $T_{j:i}$ begins with bit position i of operands A and B and ends with bit position j.

In a similar manner, each succeeding bit $G_{j:i}$ of final generate information corresponds to a block of operand bits pler module implementation. It does not affect the outcome of the addition since if the $G_{i1}$ term is TRUE, then $G_0$ will be TRUE, and the value of $T_0$ in succeeding calculations will not matter.

In addition to the determination of the propagate and generate information, the module may be used to determine the carry bits. Still assuming that the shift bit is false, the relations $$G_0 = G_{i1} + T_{i1}G_{i0}$$

and $$T_0 = G_{i1} + T_{i1}T_{i0}$$

can be rewritten as $$C_{j:k} = G_{j:i} + T_{j:i}C_{i-1:k}$$

by setting $G_{i0}$ and $T_{i0}$ equal to $C_{i-1:k}$, $G_{i1}$ equal to $G_{j:i}$, $T_{i1}$ equal to $T_{j:i}$, thereby producing $C_{j:k}$ at $G_0$ and $T_0$.

An important observation is made at this point for the module when the shift bit S is FALSE. If $G_{i1}$ and $T_{i1}$ are equal, then $G_0$ and $T_0$ are equal to each other and to $G_{i1}$ and $T_{i1}$.

Assuming now that shift bit S is TRUE, the module relationships become:

$$G_0 = G_{i0}$$

and $$T_0 = T_{i0}.$$

It can be seen that asserting shift bit S causes the $G_{i0}$ and $T_{i0}$ inputs to be buffered to the $G_0$ and $T_0$ outputs. Note that here, if $G_{i0}$ and $T_{i0}$ are equal, then $G_0$ and $T_0$ are equal to each other and to $G_{i0}$ and $T_{i0}$. Note further that when combined add/shift circuit 100 operates in the SHL, ROL, SHR, and ROR modes, at each stage of add/shift circuit 100, each generate bit $G_{k:j}$ is equal to its corresponding propagate bit $T_{k:j}$ so each pair of propagate/generate inputs to each of the modules consists of two equal bits. Consequently, in these modes, assertion and de-assertion of shift bit S causes a module to buffer disjointly the first and second pairs of propagate/generate inputs. Add/shift circuit 100 in this circumstance performs a barrel shift function. The carry bits $c_{3:0}$-$c_{0:-3}$ then represent a left-shifted version of the input bits. Shift bits $S_1 S_0$ comprise a binary representation of a number of bit positions by which the input bits are shifted to the left.

Referring still to FIG. 1, intermediate stages 104, and 106 are interconnected to provide carry bits $c_{3:0}$-$c_{0:-3}$, final propagate information bit $T_{4:1}$ and final generate information bit $G_{4:1}$. When combined add/shift circuit 100 operates in modes ADD and ADC, all of the shift bits $S_0$, $S_1$ are FALSE, and the final propagate information and final generate information, in combination with carry-in bit C=$c_{0:-3}$, is sufficient to calculate a carry-out bit $C_L$. The carry bits $c_{3:0}$-$c_{0:-3}$ may be combined with XOR information $P_3$-$P_0$ to generate the sum of first operand A and second operand B. These operations are performed by final stage 110, and the result presented by bits $R_3$-$R_0$ and $C_L$.

When combined add/shift circuit 100 operates in modes SHL, ROL, SHR, and ROR, carry bits $c_{3:0} c_{0:-3}$, final generate and propagate information bits $G_{4:1}$, $T_{4:1}$, and extra bit $E_{3:0}$, are sufficient to determine a left shifted version of the input bits with a carry-left bit and carry-right bit. This determination is performed by final stage 110, and the result presented by bits $R_3$-$R_0$, $C_L$ and $C_R$. For the SHL and ROL modes, the number of shifted positions is determined by the least significant bits of second operand B. For the SHR and ROR modes, the number of shifted positions is determined by inverting the least significant bits of second operand B (as illustrated in FIG. 2d).

Figure 3:
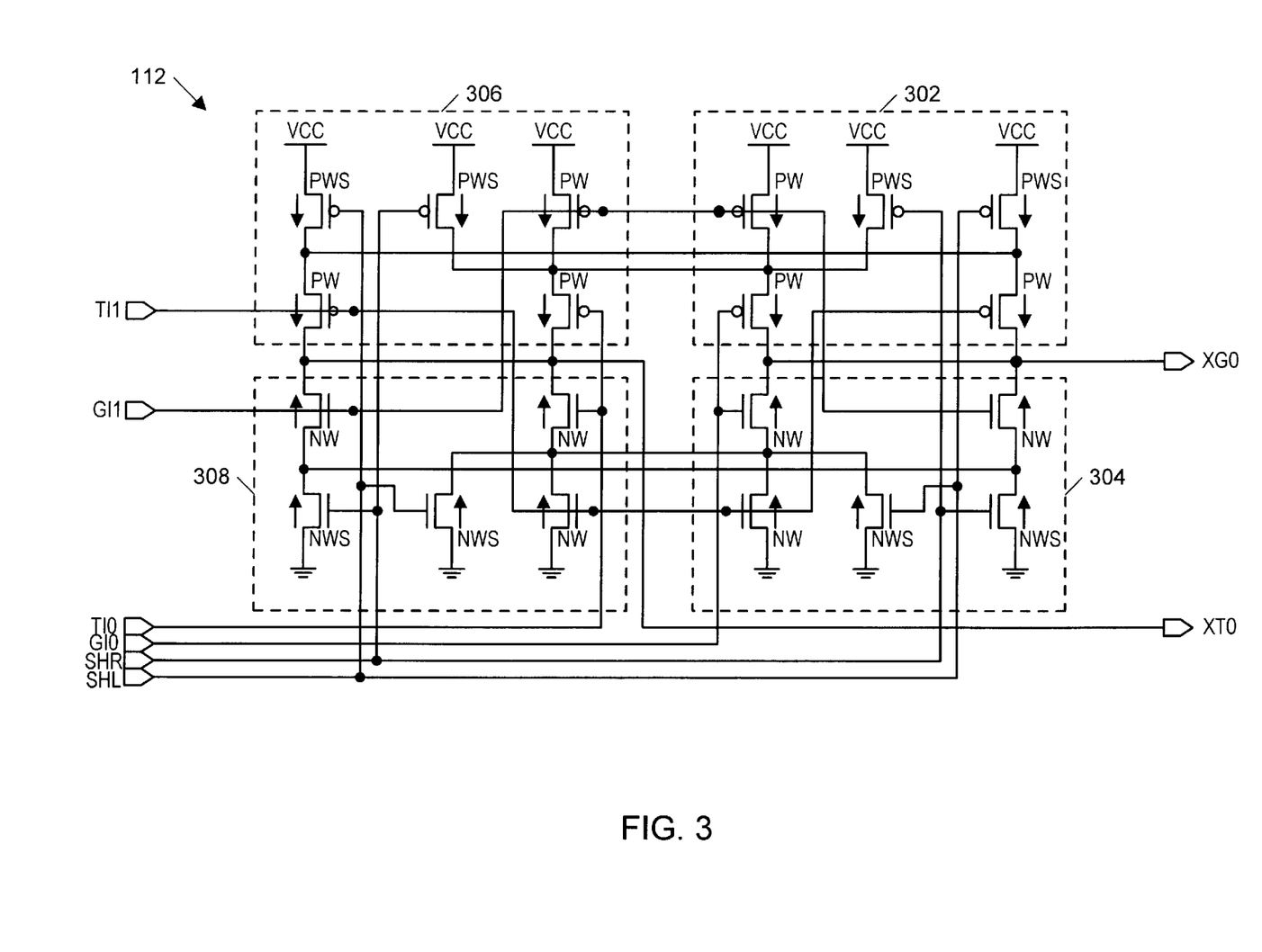
FIG. 3 is a circuit schematic for an intermediate stage module within the combined add/shift architecture disclosed herein.

Turning now to FIG. 3, a circuit schematic for intermediate stage module 112 is provided. Output line XGO ($\overline{G_0}$) is connected to PMOSFET array 302 and NMOSFET array 304. PMOSFET array 302 accepts inputs GI0 ($G_{i0}$), GI1 ($G_{i1}$), TI1 (Ti1), SHL (S), and SHR ($\overline{S}$), and is configured to implement the equation $$\overline{G_0} = \overline{T}_{i1}\overline{S} + (\overline{G}_{i1}+S)\overline{G}_{i0}.$$

In words, output line XGO is connected to positive voltage VCC if both TI1 AND SHL are FALSE, OR if GI0 is FALSE AND either GI1 OR SHR are FALSE. In all other cases output line XGO is isolated from positive voltage VCC. Whenever output line XGO is isolated from positive voltage VCC, NMOSFET array 304 connects output line XGO to ground voltage VSS. NMOSFET array 304 operates on the same inputs as PMOSFET array 302. NMOSFET array 304 is configured to implement the equation $$\overline{\overline{G_0}} = G_{i1}\overline{S} + (T_{i1}+S)G_{i0}.$$

In words, output line XGO is connected to ground voltage VSS if both GI1 AND SHR are TRUE, OR if GI0 AND either TI1 OR SHL are TRUE. In all other cases output line XGO is isolated from ground voltage VSS. It can be shown for all cases of interest that only one of the two arrays will provide an electrically conductive path at a time.

Output line XTO ($\overline{T}_0$) is connected to PMOSFET array 306 and NMOSFET array 308. PMOSFET array 306 accepts inputs TI0 ($T_{i0}$), GI1 ($G_{i1}$), TI1 ($T_{i1}$), SHL (S), and SHR ($\overline{S}$), and is configured to implement the equation $$\overline{T_0} = \overline{T}_{i1}\overline{S} + (\overline{G}_{i1}+S)\overline{T}_{i0}.$$

In words, output line XTO is connected to positive voltage VCC if both TI1 AND SHL are FALSE, OR if TI0 is FALSE AND either GI1 OR SHR are FALSE. In all other cases output line XTO is isolated from positive voltage VCC. Whenever output line XTO is isolated from positive voltage VCC, NMOSFET array 308 connects output line XTO to ground voltage VSS. NMOSFET array 308 operates on the same inputs as PMOSFET array 306. NMOSFET array 306 is configured to implement the equation $$\overline{\overline{T_0}} = G_{i1}\overline{S} + (T_{i1}+S)T_{i0}.$$

In words, output line XTO is connected to ground voltage VSS if both GI1 AND SHR are TRUE, OR if TI0 AND either TI1 OR SHL are TRUE. In all other cases output line XGO is isolated from ground voltage VSS. It can be shown for all cases of interest that only one of the two arrays will provide an electrically conductive path at a time.

It is to be noted that in the implementation of FIG. 3, the transistor arrays have no more than two transistors in series between the source voltage and the output lines. This configuration advantageously provides lower drive resistance and higher operating speed. It is to be further appreciated that an add/shift circuit such as that disclosed herein may be used in place of separate add and shift circuits, thereby reducing the chip area necessary for implementation of these functions.

It is noted that though the SHR and SHL lines of FIG. 3 are described as complements, it is advantageous in other embodiments to allow the SHR and SHL lines to be operated independently.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

What is claimed is:

1. An add/shift circuit, comprising:
   a first stage including a first plurality of modules, wherein each of said first plurality of modules performs a first one of a plurality of predetermined logic functions, wherein said first stage is configured to receive a first operand having an n-bit length, a second operand having said n-bit length and a carry bit, wherein a subset of said first plurality of modules includes n of said first plurality of modules corresponding to said n-bit length of said first and said second operands, wherein each module in said subset of said first plurality of modules is configure-d to operate on a first single bit of said first operand and a second single, bit of said second operand and to produce a third single bit of a propagate information and a fourth single bit of a generate information, thereby producing said propagate information and said generate information having said n-bit length, and wherein a first one of a remainder of said first plurality of modules generates one bit of a carry information in response to said first operand and said carry bit;

at least one intermediate stage coupled to said first stage and including a second plurality of modules, wherein each of said second plurality of modules performs a second one of said plurality of predetermined logic functions, wherein said at least one intermediate stage is configured to receive and operate on n+1−k bits of said propagate information, n+1−k bits of said generate information and k bits of said carry information, wherein k denotes a corresponding cardinal number for an order of said at least one intermediate stage, wherein said order is determined with reference to said first stage, and wherein said at least one intermediate stage is configured to generate through said second plurality of modules said propagate information having an n+1−2k bit length, said generate information having said n+1−2k bit length and said carry information having a 2k bit length; and a final stage coupled to said at least one intermediate stage and including a third plurality of modules, wherein each of said third plurality of modules performs a third one of said plurality of predetermined logic functions, wherein said final stage is configured to receive and operate on said carry information having said n-bit length, said propagate information having a single-bit length and said generate information having said single-bit length, and wherein said final stage is configured to generate through said third plurality of modules a result having said n-bit length, wherein said result is indicative of a sum of said first and said second operands if an addition mode is selected, and said result is further indicative of a left shift of said first operand if a left shift mode is selected.

2. The circuit of claim 1 wherein one of said second plurality of modules in said at least one intermediate stage is configured to receive a left shift signal $S_L$, a right shift signal $S_R$, two of said n+1−k bits of said propagate information as a first pair of inputs $T_{i0}$ and $T_{i1}$, and two of said n+1−k bits of said generate information as a second pair of inputs $G_{i0}$ and $G_{i1}$, wherein said one of said second plurality of modules is configured to determine as a first output $T_0$ one bit of said propagate information having said n+1−2k bit length, and wherein said one of said second plurality of modules is further configured to determine as a second output $G_0$ one bit of said generate information having said n+1−2k bit length, wherein said first output $T_0$ and said second output $G_0$ are determined according to the equations $$G_0=G_{i1}S_R+(T_{i1}+S_L)G_{i0} \text{ and } T_0=G_{i1}S_R+(T_{i1}+S_L)T_{i0}.$$

3. The circuit of claim 1 wherein one of said second plurality of modules in said at least one intermediate stage is configured to receive one shift bit S, two of said n+1−k bits of said propagate information as a first pair of inputs $T_{i0}$ and $T_{i1}$, and two of said n+1−k bits of said generate information as a second pair of inputs $G_{i0}$ and $G_{i1}$, wherein said one of said second plurality of modules is configured to determine as a first output $T_0$ one bit of said propagate information having said n+1−2k bit length, and wherein said one of said second plurality of modules is further configured to determine as a second output $G_0$ one bit of said generate information having said n+1−2k bit length, wherein said first output $T_0$ and said second output $G_0$ are determined according to the equations $$G_0=G_{i1}\overline{S}+(T_{i1}+S)G_{i0} \text{ and } T_0=G_{i1}\overline{S}+(T_{i1}+S)T_{i0}.$$

4. The circuit of claim 1 wherein one of said second plurality of modules in said at least one intermediate stage is configured to receive a left shift signal $S_L$, a right shift signal $S_R$, one bit from said n+1−k bits of said propagate information as a first input $T_{i1}$, and one bit from said n+1−k bits of said generate information as a second input $G_{i1}$, and one bit from said k bits of said carry information $C_i$, wherein said one of said second plurality of modules is configured to determine one bit, $C_0$, of said carry information having said 2k bit length, wherein said $C_0$ bit is determined according to the equation $$C_0=G_{i1}S_R+(T_{i1}+S_L)C_i.$$

5. The circuit of claim 1 wherein one of said second plurality of modules in said at least one intermediate stage is configured to receive one shift bit S, one bit from said n+1−k bits of said propagate information as a first input $T_{i1}$, and one bit from said n+1−k bits of said generate information as a second input $G_{i1}$, and one bit from said k bits of said carry information $C_i$, wherein said one of said second plurality of modules is configured to determine one bit, $C_0$, of said carry information having said 2k bit length, wherein said $C_0$ bit is determined according to the equation $$C_0=G_{i1}\overline{S}+(T_{i1}+S)C_i.$$

6. The circuit of claim 1 wherein one module in said subset of said first plurality of modules in said first stage is configured to receive two bits of said first operand as, $a_{i+1}$, and one bit of said second operand $b_i$, wherein said one module in said subset of said first plurality of modules is further configured to determine one bit $T_0$ of said propagate information having said n-bit length, one bit $G_0$ of said generate information having said n-bit length, and one bit of an XOR information $P_0$ according to the equations $$G_0=a_ib_i, T_0=a_i+i,$$

and $$P_0=a_i\oplus b_i$$

when an add mode is selected, and according to the equations $$G_0 = a_{i+1}, T_0 = a_{i+1},$$

and $$P_0 = 0$$

when a left shift mode is selected.

7. The circuit of claim 6, wherein said one module in said subset of first plurality of modules is still further configured to determine one bit $T_0$ of said propagate information having said n-bit length, one bit $G_0$ of said generate information having said n-bit length, and one bit of said XOR information $P_0$ according to the equations $$G_0 = a_i, T_0 = a_i, \text{ and } P_0 = 0$$

when a right rotate mode is selected.

8. The circuit of claim 7, wherein said first one of said remainder of said first plurality of modules in said first stage is coupled to receive said carry bit c, and a least-significant bit $a_0$ of said first operand having said n-bit length, wherein said first one of said remainder of said first plurality of modules is configured to produce said one bit of said carry information $c_i$ according to the equation $c_i = c$ when an add-with-carry mode is selected, and according to the equation $c_i = a_0$ when a left shift mode is selected.

9. The circuit of claim 8, wherein said first one of said remainder of said first plurality of modules is further coupled to receive a most-significant bit $a_{n-1}$ of said first operand, and wherein said first one of said remainder of said first plurality of modules is further configured to produce said one bit of said carry information $c_i$ according to the equation $c_i = a_{n-1}$ when a right shift mode is selected.

10. The circuit of claim 7 wherein a second one of said remainder of said first plurality of modules in said first stage is coupled to receive two bits of said first operand $a_i$, $a_{i-1}$, wherein said second one of said remainder of said first plurality of modules is configured to produce one bit of an extra information $E_i$ according to the equation $E_i = a_i$ when a rotate left mode is selected, and according to the equation $E_i = a_{i-1}$ when the shift right mode is selected.

11. The circuit of claim 1 wherein said each module in said subset of said first plurality of modules in said first stage is further configured to produce a fifth single bit of an XOR information having said n-bit length, and wherein one of said third plurality of modules in said final stage is configured to receive one bit $c_i$ of said carry information having said 2k bit length, and one bit of said XOR information $P_i$, wherein said one of said third plurality of modules is further configured to determine one result bit $R_i$, according to the equation $$R_i = P_i \oplus c_i, 0 < i < n.$$

12. In an add/shift circuit to add a first operand having an n-bit length and a second operand having said n-bit length, and to shift said first operand, wherein said add/shift circuit comprising:

a first stage including a first plurality of modules, wherein each of said first plurality of modules performs a first one of a plurality of predetermined logic functions, at least one intermediate stage coupled to said first stage and including a second plurality of modules, wherein each of said second plurality of modules performs a second one of said plurality of predetermined logic functions, and a final stage coupled to said at least one intermediate stage and including a third plurality of modules, wherein each of said third plurality of modules performs a third one of said plurality of predetermined logic functions, a method to implement one step in a sequence of steps to add said first operand and said second operand, said method comprising:

in said first stage:
receiving said first operand having said n-bit length $a_0 a_{n-1}$;
receiving said second operand having said n-bit length $b_0$-$b_{n-1}$;
receiving a carry-in bit c;
receiving a mode signal;
producing through one of said first plurality of modules one bit of a carry information $c_{0:0}$ according to the equation $c_{0:0} = c$ when the mode signal indicates an add mode, and $c_{0:0} = a_0$ when the mode signal indicates a left-shift mode;
producing through a subset of a remainder of said first plurality of modules a generate information having said n-bit length $G_{1:1}$-$G_{n:n}$ according to the equation $G_{i+1:i+1} = a_i b_i$ when the mode signal indicates the add mode, and according to the equation $G_{i+1:i+1} = a_{i+1}$ when the mode signal indicates the left-shift mode, $0 \leq i < n$;
producing through said subset of said remainder of said first plurality of modules a propagate information having said n-bit length $T_{1:1}$-$T_{n:n}$ according to the equation $T_{i+1:i+1} = a_i + b_i$ when the mode signal indicates the add mode, and according to the equation $T_{i+1:i+1} = a_{i+1}$ when the mode signal indicates the left-shift mode, $0 \leq i < n$; and
producing through said subset of said remainder of said first plurality of modules an XOR information having said n-bit length $P_0$-$P_{n-1}$ according to the equation $P_i = a_i \oplus b_i$ when the mode signal indicates the add mode, and $P_i = 0$ when the mode signal indicates the left-shift mode, $0 \leq i < n$.

13. The method according to claim 12, further comprising:

in said at least one intermediate stage:
receiving k bits of said carry information $C_{k-1:0} C_{0:1-k}$, wherein k denotes a corresponding cardinal number for an order of said at least one intermediate stage, wherein said order is determined with reference to said first stage;
receiving n+1−k bits of said generate information $G_{n:n+1-k}$-$G_{k:1}$;
receiving n+1−k bits of said propagate information $T_{n:n+1-k}$-$T_{k:1}$;
receiving a shift bit S;
producing 2k bits of said carry information according to the equations $$c_{i+k:i-k+1} = G_{i+k:i+1}\overline{S} + (T_{i+k:i+1} + S)c_{i:i-k+1}$$

and $$c_{i:i-2k+1} = c_{i:i-k+1}\overline{S} + S\, E_{n+i-k:n+i+1-2k}$$

for $0 \leq i < k$;

producing n+1−2k bits said generate information according to the equation $$G_{i+2k:i+1} = G_{i+2k:i+1+k}\overline{S} + (T_{i+2k:i+1+k} + S)G_{i+k:i+1}$$

for $0 \leq i < n+1-2k$; and produce n+1−2k bits of said propagate information according to the equation $$T_{i+2k:i+1} = G_{i+2k:i+1+k}\bar{S} + (T_{i+2k:i+1+k}+S)T_{i+k:i+1}$$

for $0 \leq i < n+1-2k$.

14. The method of claim 13, further comprising:

in said final stage:
receiving n bits of said carry information $c_{0:1-n}$-$c_{n-1:0}$;
receiving n bits of an XOR information $P_0$-$P_{n-1}$, wherein each of said subset of said remainder of said first plurality of modules is configured to determine one bit of said XOR information $P_i$ according to the equation $P_i = a_i \oplus b_i$ when an add mode is selected, $0 < i < n$;
receiving said generate information having a single-bit length $G_{1:n}$;
receiving said propagate information having said single-bit length $T_{1:n}$;
producing a result having said n-bit length $R_0$-$R_{n-1}$ according to the equation $$R_i = c_{i:i+1-n} \oplus P_i, \ 0 < i < n;$$

and producing a carry-out bit $C_L$ according to the equation $$C_L = G_{1:n} + T_{1:n}c_{0:1-n}.$$

15. The method of claim 12, further comprising:

producing an extra information having said n-bit length $E_{0:0}$-$E_{n-1:n-1}$ in said first stage according to the equation $$E_{i:i} = 0 \text{ for } 0 \leq i < n$$

when the mode signal indicates a, left-shift mode, and according to the equation $$E_{i:i} = a_i \text{ for } 0 \leq i < n$$

when the mode signal indicates a left-rotate mode.

* * * * *